(12) United States Patent
Pollock et al.

(10) Patent No.: US 7,539,814 B2
(45) Date of Patent: May 26, 2009

(54) SELECTING A TARGET DESTINATION USING SEEK COST INDICATORS BASED ON LONGITUDINAL POSITION

(75) Inventors: Brian R. Pollock, Eden Prairie, MN (US); Reed David Hanson, Chaska, MN (US); Nathaniel Boyd Wilson, Edmond, OK (US); Jason Dale Gregg, Longmont, CO (US); Mark Larry Birtzer, Lake City, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1140 days.

(21) Appl. No.: 10/606,597

(22) Filed: Jun. 26, 2003

(65) Prior Publication Data

US 2004/0049605 A1  Mar. 11, 2004

Related U.S. Application Data

(60) Provisional application No. 60/408,433, filed on Sep. 5, 2002.

(51) Int. Cl.
G06F 12/00 (2006.01)
G06F 13/00 (2006.01)
G06F 13/28 (2006.01)
G11B 21/08 (2006.01)

(52) U.S. Cl. .................................. 711/112; 369/30.1

(58) Field of Classification Search ................. 711/112; 369/30.1
See application file for complete search history.

(56) References Cited

U.S. PATENT DOCUMENTS

| 5,570,332 | A | * | 10/1996 | Heath et al. ................. 369/30.1 |
| 5,644,786 | A | | 7/1997 | Gallagher et al. |
| 6,170,042 | B1 | | 1/2001 | Gaertner et al. |
| 6,198,591 | B1 | | 3/2001 | Hampshire |
| 6,272,565 | B1 | * | 8/2001 | Lamberts ..................... 710/43 |
| 6,279,108 | B1 | | 8/2001 | Squires et al. |
| 6,285,522 | B1 | | 9/2001 | McKenzie et al. |
| 6,339,811 | B1 | | 1/2002 | Gaertner et al. |
| 6,388,413 | B1 | | 5/2002 | Ng et al. |
| 6,441,988 | B2 | * | 8/2002 | Kang et al. .............. 360/78.06 |
| 6,476,995 | B1 | | 11/2002 | Liu et al. |
| 6,496,877 | B1 | | 12/2002 | Greenberg et al. |
| 2001/0032292 | A1 | | 10/2001 | Hoskins et al. |

* cited by examiner

*Primary Examiner*—Sheng-Jen Tsai
(74) *Attorney, Agent, or Firm*—Myers Bigel Sibley & Sajovec

(57) ABSTRACT

A processor is configured to perform a method (110) including a step of deriving lateral offset indicators (1062) from a longitudinal position measurement (130). Improved seek cost indicators (1063) are generated, some or all based on a respective lateral offset indicator (140). Then a target destination is selected using at least one of the improved seek cost indicators (150,160).

18 Claims, 7 Drawing Sheets

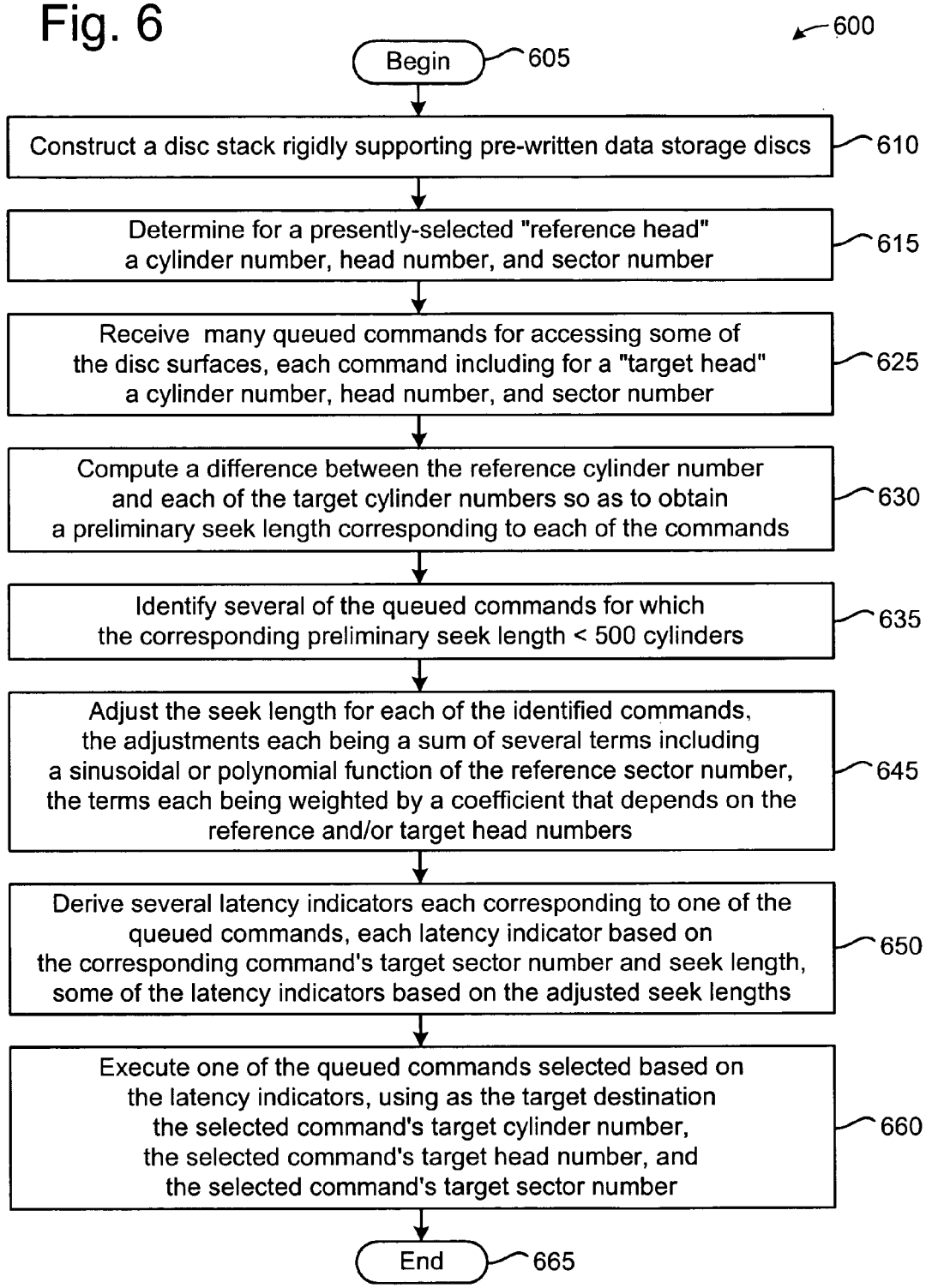

```
// Function:   sa_EvalDeltaS ()
// Parameters: S_Head, D_Head, StartSector, SrcCyl
// Return:     Adjustment to be added to the preliminary seek length
//=================================================================
//           EffectiveDistance = DestCyl + DeltaL(Dest) - SrcCyl - DeltaL(Src)
//                             = DestCyl + DeltaS(Dest,Src) - SrcCyl
//           DeltaL(Location) = c0(h) + c1(h)*NormalizedSrcCyl>>15
//                            + c2(h)*(NormalizedSrcCyl^2)>>30
//                            + c3(h)*sine(StartingSector) + c4(h)*cosine(StartingSector)
//           DeltaS(Dest,Src) = DeltaL(Dest) - DeltaL(Src)
//                            = c0(D_Head) - c0(S_Head)
//                            + (c1(D_Head) - c1(S_Head)) * NormalizedSrcCyl>>15
//                            + (c2(D_Head) + c2(S_Head)) * (NormalizedSrcCyl^2)>>30
//                            + (c3(D_Head) - c3(S_Head)) * sine(StartingSector)>>15
//                            + (c4(D_Head) - c4(S_Head)) * cosine(StartingSector)>>15
//
//     pd_Opr_ai16Q15SineTable(x) = round(32767*sine(x*2*Pi/SECTORS_PER_REV))
//=================================================================
int16 sa_EvalDeltaS (uint16 S_Head, uint16 D_Head, uint16 u16_Sector, int32 i32_Cyl)
{
  static int32 i32_DeltaL =0;   // output before final RightShift
  #define  C0_SHIFT   15
           // RightShift for total to convert to integer tracks (=15+Qvalue of DC terms))
  #define  C1_SHIFT   4
           // RightShift for cylinder input, selected so that:
           //      (Max_Cyl >>C1_SHIFT) is between 8K and 32K.

i32_DeltaL = ((int32)(Table.i16_DeltaS[D_Head][4] - Table.i16_DeltaS[S_Head][4])
        * (int32)pd_Opr_ai16Q15SineTable[u16_Sector+SECTORS_PER_REV/4 ]) ;

i32_DeltaL +=((Table.i16_DeltaS[D_Head][3] - Table.i16_DeltaS[S_Head][3])
        * (int32)pd_Opr_ai16Q15SineTable[u16_Sector]) ;

i32_DeltaL +=((Table.i16_DeltaS[D_Head][2] - Table.i16_DeltaS[S_Head][2])
        * (i32_Cyl >> C1_SHIFT)*((i32_Cyl >> C1_SHIFT)>>C0_SHIFT) ) ;

i32_DeltaL +=((Table.i16_DeltaS[D_Head][1] - Table.i16_DeltaS[S_Head][1])
        * (i32_Cyl >> C1_SHIFT)) ;

i32_DeltaL +=(Table.i16_DeltaS[D_Head][0] - Table.i16_DeltaS[S_Head][0])
        << C0_SHIFT;                       // could also add this term after final shift return (int16) ((i32_DeltaL + (1<<(C0_SHIFT-1) ))>> C0_SHIFT);
        // round off and shift to q0.
}
```

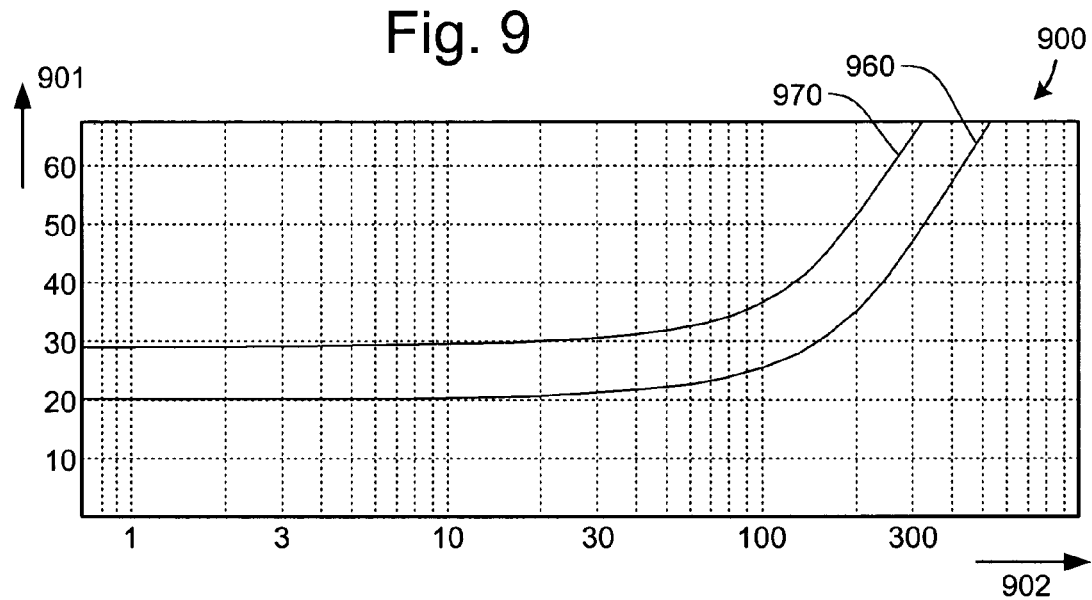

| | 1051 | 1052 | 1053 | 1054 | | 1061 | 1062 | 1063 | 1064 |
|---|---|---|---|---|---|---|---|---|---|
| 1001 → | 0 | 18129 | 0 | 1 | ... | -12871 | | -12871.0 | |
| 1002 → | 0 | 31045 | 0 | 6 | ... | 45 | -29.7 | 15.3 | |
| | 0 | 30994 | 3 | 13 | ... | -6 | -10.0 | -16.0 | |
| | 0 | 30953 | 3 | 16 | ... | -47 | -10.0 | -57.0 | |
| | 0 | 26514 | 3 | 28 | ... | -4486 | | -4486.0 | |
| | 0 | 26514 | 2 | 33 | ... | -4486 | | -4486.0 | |
| | 1 | 18124 | 2 | 33 | ... | -12876 | | -12876.0 | |
| 1008 → | 0 | 30969 | 2 | 44 | ... | -31 | 0.0 | -31.0 | |
| 1009 → | 0 | 26528 | 1 | 56 | ... | -4472 | | -4472.0 | N |
| 1010 → | 1 | 30998 | 2 | 59 | ... | -2 | 0.0 | -2.0 | N |
| 1011 → | 0 | 31014 | 2 | 63 | ... | 14 | 0.0 | 14.0 | N |
| 1012 → | 0 | 14733 | 3 | 65 | ... | -16267 | | -16267.0 | N |
| 1013 → | 0 | 30973 | 0 | 69 | ... | -27 | -29.6 | -56.6 | N |
| 1014 → | 0 | 31022 | 1 | 78 | ... | 22 | -28.3 | -6.3 | N |
| 1015 → | 1 | 31039 | 1 | 81 | ... | 39 | -28.4 | 10.6 | Y |
| | 0 | 31029 | 1 | 88 | ... | 29 | -28.3 | 0.7 | Y |
| | 0 | 26523 | 1 | 96 | ... | -4477 | | -4477.0 | N |
| | 0 | 31010 | 3 | 97 | ... | 10 | -10.0 | 0.0 | Y |
| | 1 | 26514 | 1 | 106 | ... | -4486 | | -4486.0 | N |
| | 1 | 31026 | 2 | 108 | ... | 26 | 0.0 | 26.0 | Y |
| | 0 | 18098 | 0 | 111 | ... | -12902 | | -12902.0 | N |
| | 0 | 31020 | 2 | 114 | ... | 20 | 0.0 | 20.0 | Y |
| | 0 | 18125 | 2 | 116 | ... | -12875 | | -12875.0 | N |
| | 0 | 31024 | 3 | 117 | ... | 24 | -10.0 | 14.0 | Y |
| | 0 | 18122 | 2 | 117 | ... | -12878 | | -12878.0 | N |
| | 0 | 26520 | 1 | 119 | ... | -4480 | | -4480.0 | |
| | 0 | 26526 | 0 | 122 | ... | -4474 | | -4474.0 | |
| | 0 | 31033 | 1 | 127 | ... | 33 | -28.3 | 4.7 | |
| | 0 | 31027 | 3 | 130 | ... | 27 | -10.0 | 17.0 | |
| | 1 | 31022 | 0 | 142 | ... | 22 | -29.6 | -7.6 | |
| | 0 | 18124 | 2 | 145 | ... | -12876 | | -12876.0 | |
| | 1 | 30989 | 1 | 157 | ... | -11 | -28.3 | -39.3 | |
| | 1 | 31052 | 2 | 164 | ... | 52 | 0.0 | 52.0 | |
| | 0 | 30997 | 2 | 169 | ... | -3 | 0.0 | -3.0 | |
| | 0 | 30958 | 3 | 172 | ... | -42 | -10.0 | -52.0 | |
| | 1 | 2801 | 3 | 184 | ... | -28199 | | -28199.0 | |
| | 0 | 15275 | 1 | 188 | ... | -15725 | | -15725.0 | |
| 1038 → | 0 | 31043 | 3 | 189 | ... | 43 | -10.0 | 33.0 | |
| | ... | ... | ... | ... | | | | | |

SELECTING A TARGET DESTINATION USING SEEK COST INDICATORS BASED ON LONGITUDINAL POSITION

CROSS-REFERENCE TO RELATED APPLICATIONS

This application claims the benefit of U.S. provisional application Ser. No. 60/408,433 filed Sep. 5, 2002, titled "Enhanced Seek Distance Determination."

1. Field of the Invention

This application relates generally to positioning systems, and more particularly to such systems that decide the ordering of command execution.

2. Background of the Invention

Computers and other types of host systems frequently transfer data to and from nonvolatile storage devices such as disc drives. In modern disc drives, storage capacity demands have increased at a dramatic rate, which has caused great difficulties in the cost-effective manufacture of such drives. A variety of schemes have arisen to cope with this challenge, some of which complicate the operation of a disc drive. For example, some modern disc drives are self-servowritten, by which it is meant that the drive writes its own servo reference marks onto its data surface(s) with little or no interaction with high precision servowriting machines. Other modern disc drives use media that is pre-written, by which it is meant that the servo marks are written before the discs are installed into the disc drive housing. Both of these approaches introduce substantial misalignments that can affect the speed at which a given disc access command is performed.

In an ordinary operating mode the process of transferring data to or from a specific media location is initiated by the host system or device, which issues a command across a bus using a defined protocol. Some interface protocols, such as the Small Computer System Interface (SCSI) protocol, allow multiple commands to be queued in a memory within the disc drive. In other words, a read or write command can be issued from the host and placed in queue without having to wait for the execution of any outstanding commands to be completed. In other systems, such queuing is carried out by the host.

Typically, disc drives are adapted to execute the commands in an order which is deemed most appropriate based upon the types of commands in the queue. Intelligent disc controller firmware sorts the commands, using any of a variety of sorting algorithms, in order to reduce mechanical delays within the drive. Mechanical delays include the times required to seek, to spin to the beginning of a block of data, and to transfer the data associated with the command. Proper sorting of queued commands can dramatically improve the performance of a disc drive data storage system by reducing these mechanical delays. For further background, see U.S. Pat. No. 6,170,042, "Disc Drive Data Storage System and Method for Dynamically Scheduling Queued Commands," issued 2 Jan. 2001 to Gaertner et al.

Unfortunately, no queue management systems exist that can account for misalignments such as those that exist in modern disc drives. What is needed is an effective system for taking such misalignments into account when deciding an order in which to access potential target destinations.

SUMMARY OF THE INVENTION

A host or local processor is configured to select a target destination using lateral seek cost indicators that are each partly based on a corresponding lateral offset indicator derived from a longitudinal position measurement. In one method embodiment, this improved selection process is used to obtain a more efficient ordering of data storage access commands. The (scalar) position measurement is obtained during or just after a prior command execution. Several seek lengths are estimated, each corresponding to a queued command, a first one of the estimated seek lengths being "one" of the lateral seek cost indicators. After determining that the "one" lateral seek cost indicator corresponds to one of the queued commands that refers to a "non-ideal" target, a more desirable one of the queued commands is selected. (As used herein a "non-ideal" target is one that is not reliably reachable within a system-defined major period such as nominal disc stack revolution time.)

In a first alternative method embodiment, each of the lateral seek cost indicators is calculated as an arithmetic combination of several terms, at least one of the terms being a sinusoidal or other periodic function of the longitudinal position measurement. The lateral offset indicators are each used to adjust a "raw" seek length so as to determine an "effective" seek length for each of several queued commands. These effective seek lengths can be used to assess nearby potential short seeks with improved accuracy, so that an "apparently non-ideal" target can be selected or so that an "apparently ideal" target can be passed over. Either of these types of corrections will improve queue execution performance.

In a second alternative method embodiment, a disc stack is configured to support pre-written data storage discs into a disc drive so that the target destination is a storage location on one of the discs. A calibrated offset model is then derived based on the configuration, defining how the longitudinal position measurement affects the lateral offset indicators.

In a third alternative method embodiment, a "source location" is identified by specifying a cylinder identifier, a head identifier, and a sector identifier, the sector identifier being the longitudinal position measurement. Many queued commands are received, each also including a cylinder identifier, a heard identifier, and a sector identifier. A difference is computed between the source cylinder identifier and each of the target cylinder identifiers so as to obtain a preliminary seek length corresponding to each of the (longitudinally proximal) queued commands. Some of the queued commands are identified so that each corresponds to a preliminary seek length smaller than a given magnitude. The seek length corresponding to each of the identified commands is adjusted, the adjustments each being partly based on the corresponding identified command's target head identifier, on the source head identifier, and on the source sector identifier. (These "adjustments" are the lateral offset indicators, and the "adjusted indicators" include the lateral seek lengths.) Several latency indicators are then derived so that each corresponds to one of the queued commands, each of the latency indicators based on the corresponding command's target sector identifier and seek length. Some or all of the latency indicators are based on the adjusted seek lengths. Then one of the queued commands is selected for execution based on the latency indicators using as the target "destination" the selected command's target cylinder, head and sector identifiers.

A device embodiment of the present invention includes a disc stack and a controller configured to execute software-implemented methods described in this document. The disc stack has at least two rigidly supported, pre-written data storage discs. The controller is configured to select a target destination on one of the discs using lateral seek cost indicators that are each partly based on a corresponding lateral offset indicator derived from a circumferential position measurement.

Another device embodiment further includes a target head and a source head, the source head being the one configured to generate the longitudinal position measurement. The target head is able to access the target destination, and the source head is not able to access the target destination. The controller includes a random-access memory that is constructed and arranged with enough space to contain a queue of more than 32 disc access commands that each include a target cylinder identifier, a target head identifier, and a target sector identifier.

Additional features and benefits will become apparent upon reviewing the following figures and their accompanying detailed description.

BRIEF DESCRIPTION OF THE DRAWINGS

FIG. 6 shows a flowchart of another method of the present invention.

FIG. 7 shows a specific function coded in the "C" programming language, implementing one of the steps of FIG. 6.

FIG. 8 shows a table with specific values for use with the coded function of FIG. 7, the values calibrated for an actual disc drive.

FIG. 9 shows a seek performance model for the electromechanical system that accesses the disc stack of FIG. 5 for reading or writing.

FIG. 10 shows a queue that contains commands to be manipulated in illustrating the operation of the present invention, and related computed values.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of basic engineering and of positioning technologies that are not a part of the present invention (or are well known in the art) are omitted for brevity, avoiding needless distractions from the essence of the present invention. For example, this document does not articulate detailed and diverse methods for executing a seek, settle, track follow, or data transfer portion of a read or write command. Neither does it include implementation decisions such as whether virtual sector numbers are used to compensate for circumferential offsets between data discs. Specific techniques for constructing controller interface modules are likewise omitted, typically being a matter of design choice to those of ordinary skill in that field of technology.

Definitions and clarifications of certain terms are provided in conjunction with the descriptions below, all consistent with common usage in the art but some described with greater specificity. A "longitudinal" direction is aligned with sensor's nominal direction of motion in a given (stationary or moving) frame of reference. For example, a transducer following a track is moving longitudinally, whereas a transducer moves "laterally" when seeking. A "lateral" direction is one that forms an angle of more than 45 degrees with the longitudinal direction, and typically more than 70 degrees. A seek "length" is a lateral seek cost indicator having units of length or track count increments.

Figure 1:
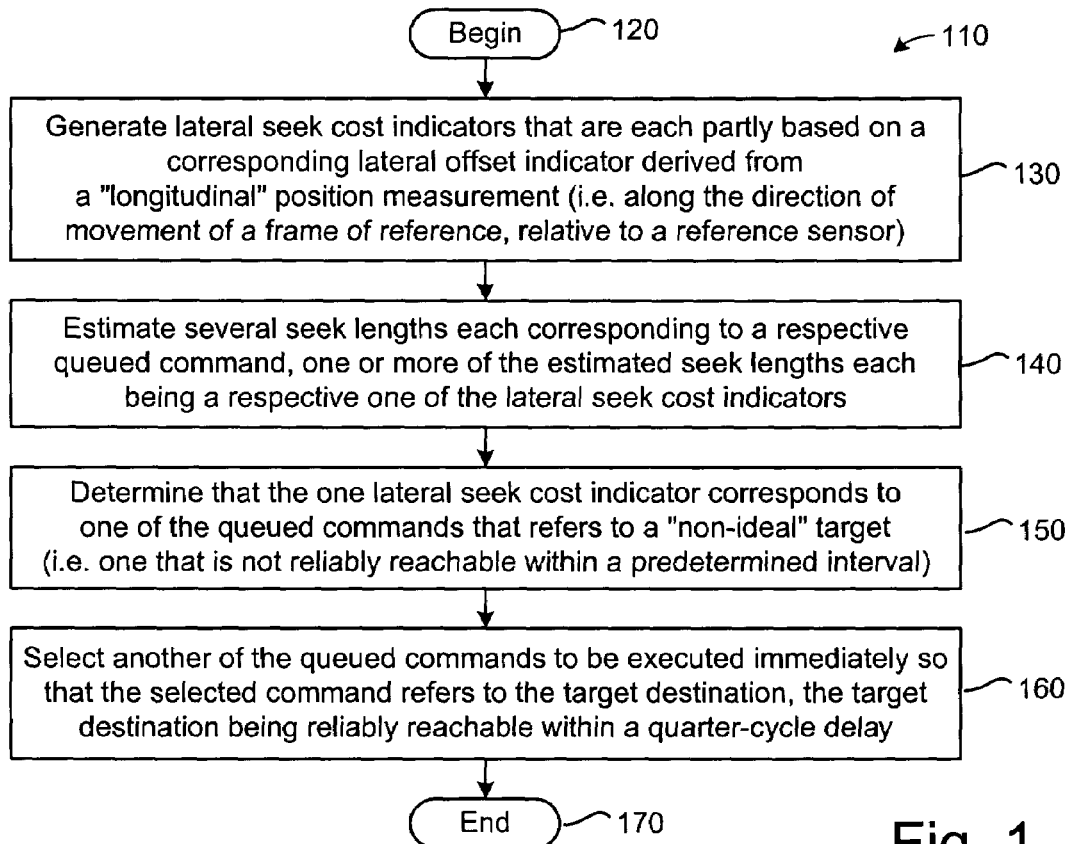
FIG. 1 shows a flowchart of a method of the present invention.

Turning now to FIG. 1, there is shown a method 110 embodying the present invention, comprising steps 120 through 170. Lateral seek cost indicators are generated based on a corresponding lateral offset indicator that is derived from a longitudinal position measurement 130. Several seek lengths are estimated, each corresponding to a respective queued command, one or more of the estimated seek lengths each being a respective one of the lateral seek cost indicators 140. When it is determined that the one lateral seek cost indicator corresponds to one of the "non-ideal" queued commands 150, another of the queued commands is selected for execution 160, one that is reliably reachable within a predetermined interval. After removing the executed command from the queue, steps 130 through 160 are repeated until there are no more "ideal" targets 170. Using method 110 results in several commands being executed in rapid succession, especially for a deep queue containing commands with tightly clustered targets.

Figure 2:
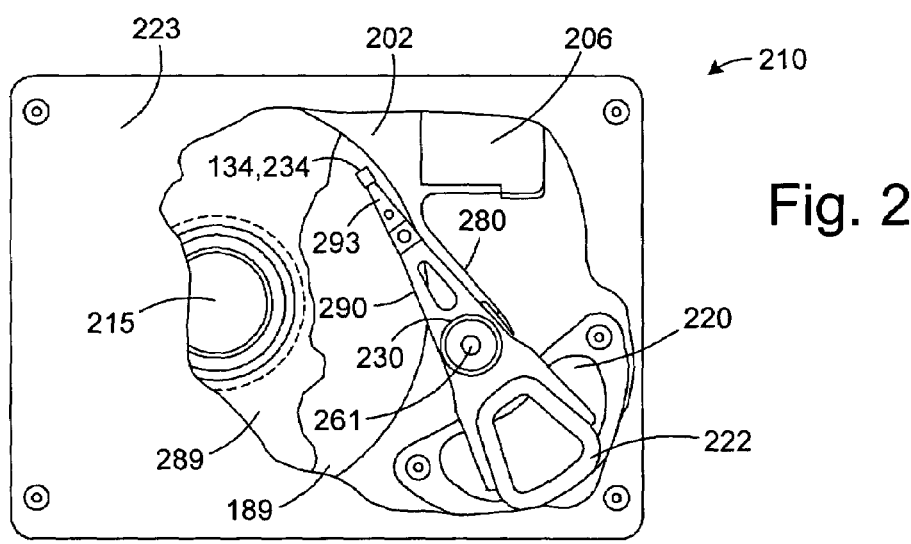
FIG. 2 shows a disc drive constructed to benefit from the present invention.

FIG. 2 shows a "top view" of a disc drive 210 constructed to benefit from the present invention. (Terms like "top view" are arbitrary here, in that data handling systems like drive 210 can generally operate in any orientation.) Drive 210 includes "top" cover 223 that cooperates with base 202 to form a sealed chamber. Components supported in the chamber include a spindle motor 215 which rotates a stack comprising one or more data storage discs 189,289 at hundreds or thousands of revolutions per minute. Information is written to and read from data surfaces on the disc(s) 189,289 through the use of an actuator assembly 261, which rotates during a seek operation about a bearing shaft assembly 230. Actuator assembly 261 includes one or more actuator arms 290 which extend above and below each of the disc(s) 189,289, with one or more flexures 293 extending from each of the actuator arms. Mounted at the distal end of each of the flexures is a head 134,234 that can fly in close proximity adjacent the corresponding data surface of an associated disc 189,289.

Servo and user data travels through a selected one of the heads 134,234 and flex cable 280 to control circuitry on controller board 206. (Controller board 206 is configured to interface with a host like disc controller unit 506 of FIG. 5 does, to perform a method of the present invention according to FIG. 1 or FIG. 6.) Flex cable 280 maintains an electrical connection by flexing as each head 134,234 seeks along its path between tracks on disc(s) 189,289.

During a seek operation, the overall track position of heads 134,234 is controlled through the use of a voice coil motor (VCM), which typically includes a coil 222 fixedly attached to actuator assembly 261, as well as one or more permanent magnets 220 which establish a magnetic field in which coil 222 is immersed. The controlled application of current to coil 222 causes magnetic interaction between permanent magnets 220 and coil 222 so that coil 222 moves. As coil 222 moves, actuator assembly 261 pivots about bearing shaft assembly 230 and heads 134,234 are caused to move across the surfaces of the disc(s) 189,289 between the inner diameter and outer diameter of the disc(s) 189,289.

Difficulties have arisen in the cost-effective manufacture of data handling systems like that of FIG. 2. Many of the difficulties relate to exceedingly high track pitch and precise timing requirements. For example, servo-writing many thousands of finely-pitched tracks takes a lot longer than servowriting at lower densities. For this reason some manufacturers are looking to systems for installing pre-written discs into a data handling system. Others are looking to systems for having the data handling system servo-write itself. Both of these techniques can introduce significant offsets between detections of marked positions not previously encountered.

Figure 3:
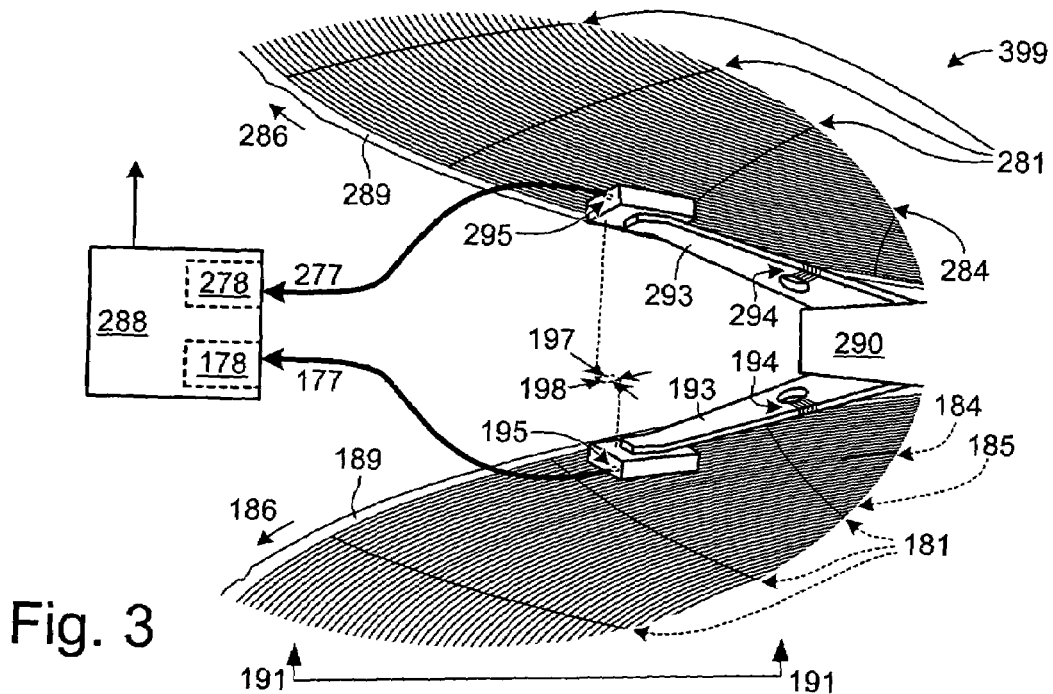
FIG. 3 shows a close-up "side view" from between two of the discs of the disc drive of FIG. 2.

To illustrate this FIG. 3 shows a close-up "side view" 399 from between two of the discs 189,289 of disc drive 210 (not to scale). As FIG. 3 shows, rotary actuator arm 290 supports read/write transducers 195,295, respectively positioned to access outer tracks 184,181 of disc 189 and/or from outer tracks 284 of disc 289. The pitch between tracks 184,284 is actually exceedingly fine, orders of magnitude denser than those shown. Read/write transducers 195,295 are supported by arm 290 via flexures 193,293, which are respectively equipped with microactuators 194,294. In implementing the present invention, fine control of the position of read/write transducers 195,295 is optionally made with the microactuator(s) 194,294.

Note that offset 198 is depicted in a circumferential direction relative to discs 189,289, which rotate on a spindle at a controlled speed about a common axis as shown by respective movement indicators 186,286. Offset 198 shows that transducer 195 leads transducer 295 slightly. Transducer 195 also happens to be closer to the discs' axis of rotation than transducer 295, as indicated by radial offset 197. Transducer 195 generates an output 177 that is received into buffer 178 of processor 288, which is implemented in control circuitry of controller board 206 of FIG. 2. Transducer 295 similarly generates an output 277 that is received into buffer 278. (Transducers 195,295 transmit outputs 177,277 via a preamplifier circuit supported on the actuator, not shown.)

An important component of transducer outputs 177,277 is position information found in servo wedges 181,281 on respective surfaces. (In FIG. 3, note that servo wedges 181 will not be encountered by transducer 195 at the same time that servo wedges 281 are encountered by transducer 295.) Most or all of the position information that enables transducers 195,295 stay on their respective tracks is found in marks within the servo wedges. It should be understood that servo "wedges" are so named because they ordinarily taper narrower near the inner tracks of each surface. Also, the wedges are typically not perfectly radial. They each curve in a generally circular arc so that a rotation of actuator 330 will not greatly alter the time at which a given servo wedge will be encountered by a corresponding transducer.

Figure 4:
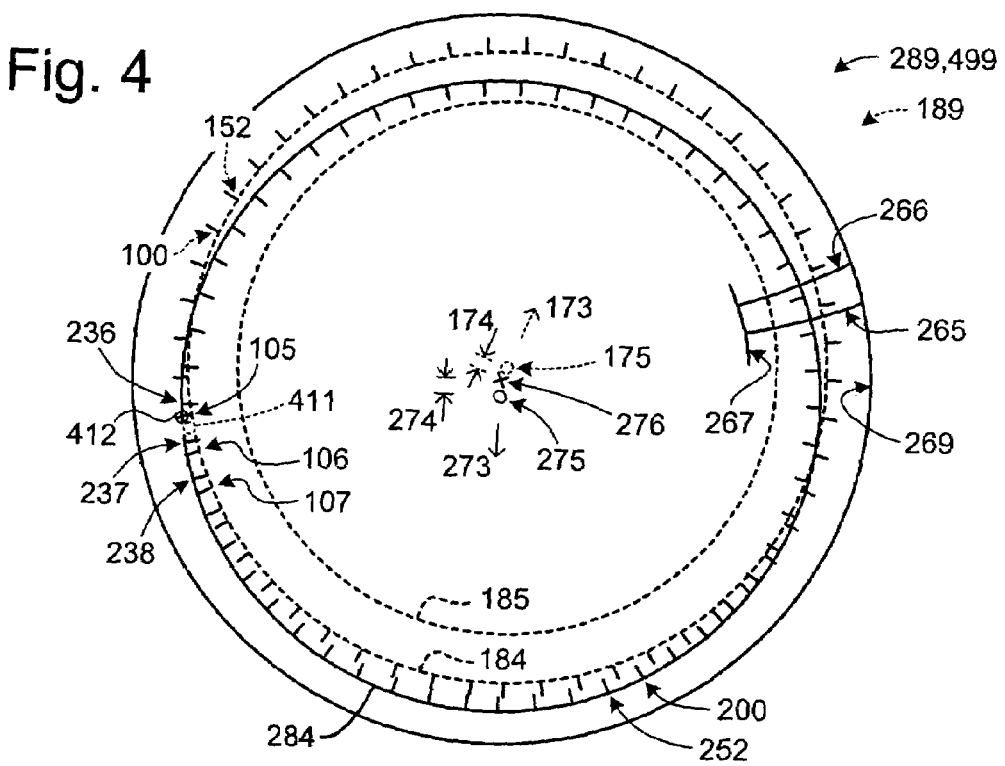
FIG. 4 shows a "bottom view" of selected items in FIG. 3 to illustrate one of the problems that has created the need for the present invention.

This can be seen more easily in FIG. 4, a "bottom view" 191 of selected items in FIG. 3, in the rotating frame of reference 499 of disc 289. Arcuate servo wedges 265,266 are shown to extend between an outer diameter 269 and an inner diameter 267. Transducer 295 follows a nominally circular track 284 near the outer diameter 269, while transducer 195 zigzags along somewhere near offset circular track 184,185 of disc 189. Track 284 has a center 275 that is offset from the discs' axis of rotation 276 by an offset 274 in a direction (phase) 273 as shown. Tracks 184,185 similarly share a center 175 that is offset from the discs' axis of rotations 276 by an offset 174 in a direction (phase) 173 as shown. Offsets 174, 274 are shown atypically large for clarity. For pre-written discs installed into a data handling system, it is expected that each track-center offset will be at least one to three orders of magnitude greater than a nominal track pitch. Centering errors of a similar magnitude may arise in field operation, particularly in laptop computers that suffer lateral shocks. Optionally the present invention includes steps of (1) detecting that such a centering error exists in periodic field calibration, and (2) responding so as generally to attenuate seek length estimation errors by recalibrating several values in a table (see table 800 of FIG. 8).

Recalling that FIG. 4 is a view from the discs' frame of reference, it will be understood that transducers 195 & 295 seek or track follow radially as they rotate about the axis of rotation 276. At a selected moment of interest, transducer 195 is in position 411 and transducer 195 has just detected position 105. It is being de-selected, after which it will encounter positions 106 and 107. Transducer 295 is in position 412, lagging and further out as shown in FIG. 3. Transducer 295 has just encountered position 236 without detecting it, is being activated, and is about to encounter and detect positions 237 and 238. Circumferential positions 100 through 152 on disc 189 are all encountered by transducer 195 during its rotation. Circumferential positions 200 through 252 on disc 289 are all encountered by transducer 295 during its rotation. All of these positions 100-152 & 200-252 are wedges that include a physical wedge number that is at least zero and at most 52. In modern hard disc drives there are hundreds of such wedges on each data surface.

Figure 5:
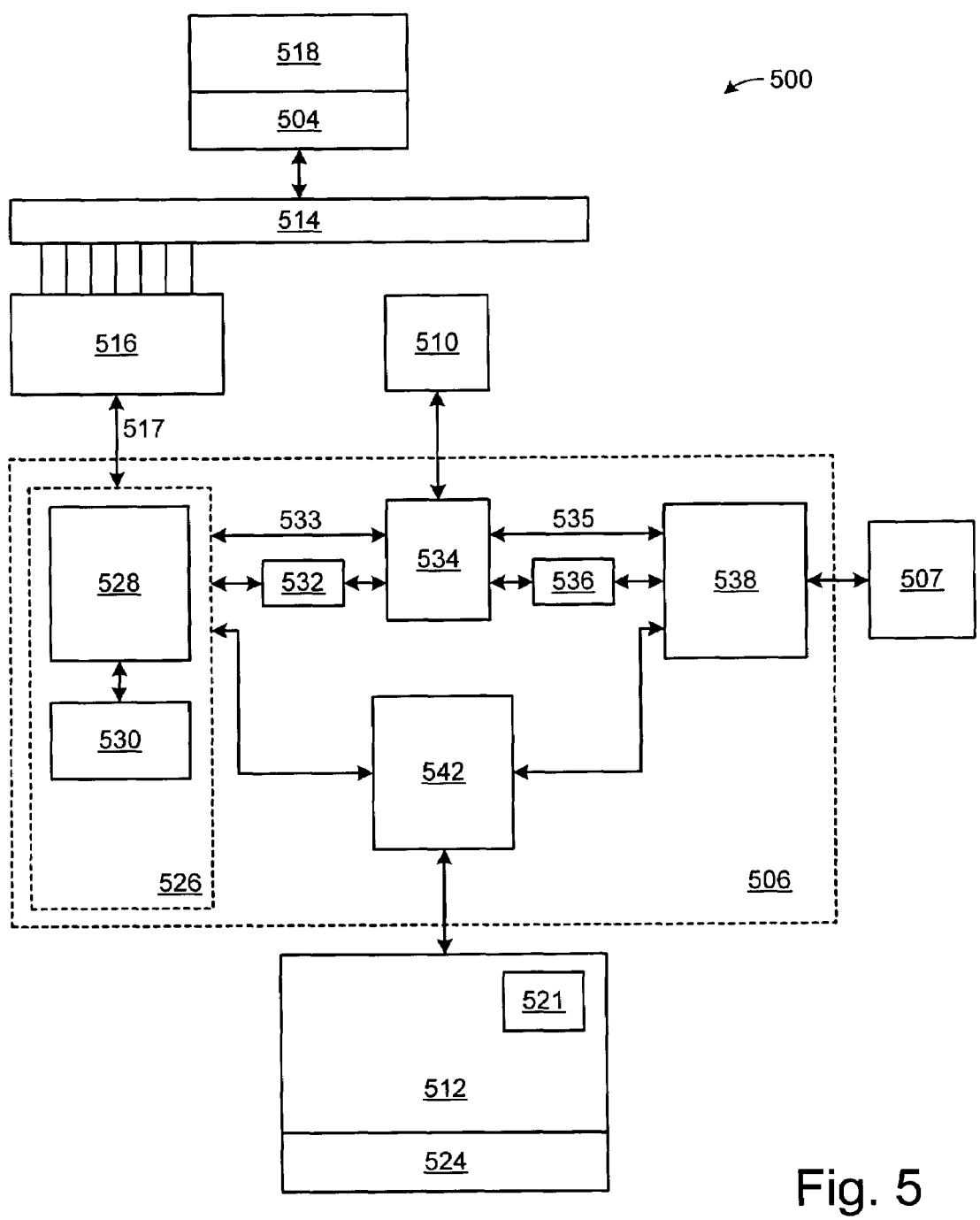
FIG. 5 shows a computer system implementing the present invention.

FIG. 5 shows a computer system 500 implementing the present invention. Host CPU 504 is configured to communicate with a disc controller unit 506 to transmit data to or from a disc stack 507. Associated with disc controller unit 506 are disc buffer cache 510 (where data can be temporarily stored to shorten access time) and a local microcontroller 512 that controls unit 506.

Host CPU 504 executes system software 518, and communicates with the disc controller unit 506 through CPU system bus 514, disc interface adapter 516 that provides decode and electrical buffering, and disc interface cable 517. Disc controller unit 506 may be implemented in any number of ways, provided there is general similarity with the industry-accepted AT Attachment ("ATA"), SCSI or other common interface protocol in effect as of this filing. The host interface protocol defines the interface between a host processor (e.g., CPU 504) communicating over a host bus 514 (e.g., a serial ATA bus) and a disc controller unit (e.g., unit 506).

Some of these interface protocols define a set of task registers, a disc interface cable connector, and associated interface signals. The defined task register set includes a command register containing the command code being sent to the disc drive, a data register for transferring data blocks between the controller buffer and the host processor, registers concerned with the relevant disc drive address, sector and read/write head, and registers containing status information including error posting.

Some of these interface protocols also require certain real-time CPU-controller interface functions to be performed by the controller unit. For example, an inter-sector handshake may be required at each sector boundary on a disc, whereby the status of a previous sector must be posted before reading or writing from the next sector. Further, controller unit task file registers may require updating to indicate the identity of the sector currently being transferred. Finally, all write data may be automatically receipted for. One skilled in the art will recognize that many of these optional features of system 500 create synergies with the present invention that can be advantageous.

The example of system 500 is primarily a block interface. Host CPU 504 requests a block of data to or from the controller unit 506 in terms of a physical cylinder-head-sector (CHS) address, but does not specify or control where or in what form that data shall be stored in buffer cache 510, or on the disc stack 507. Buffer cache 510 is optionally implemented as Dynamic Random Access Memory ("DRAM").

As shown in FIG. 5, controller unit 506 includes a host interface unit 526 preferably comprising a microprocessor-controlled sequencer, or state machine 528 and a set of registers 530, including interface-compliant task registers. Unit 526 further includes buffer control unit 534 that communicates with the interface unit 526 via a First-In First-Out ("FIFO") buffer 532, that communicates with a disc sequencer 538 via a second FIFO buffer 536. Control unit 534 also communicates with the disc buffer cache 510. Disc sequencer 538 transmits data between disc cache 510 (via buffer control 534) and disc stack 507. Lines 533,535 transmit address and control information to and from buffer control unit 534 as shown.

Controller unit 506 also includes a local microprocessor interface 542 that communicates with the sequencer unit 528, and with a disc sequencer/state machine 538. The disc sequencer 538 is also coupled between FIFO 536 and the disc stack 507, and preferably also to an Error Correcting Code ("ECC") logic unit (not shown) that corrects data read from the disc stack 507.

Within controller 506, data is stored in FIFO 536 before either transmission to disc stack 507 or to buffer cache 510. FIFO buffers 532 and 536 are each sized to hold less than one sector's worth of data. This advantageously permits data stored in FIFO 536 to be read out while data are being written into FIFO 532. Buffer control 534 addresses and provides buffer cache read/write timing signals and controls to the buffer cache 510.

Upon command from the host processor 504, data to or from memory associated with the host CPU is parallel-transferred into the controller unit 506 through the interface unit 526, FIFO 532, and then into the disc buffer cache 510. Upon receipt of a host CPU command, the controller unit local microprocessor 512 is interrupted, or the local microprocessor may simply be in a polling loop, continuously testing to see whether a host CPU command has been received. In either case, once an incoming command is recognized, local microprocessor 512 then reads task file registers (among registers 530) and decodes the command and command bits from the command register.

Task file registers (among registers 530) within interface unit 526 are updated repeatedly during disc drive data transfer operations. As such, the host system software 518 accesses the task file registers 530 to monitor data transfer and to associate errors reported by disc stack 507 with respect to particular sectors. Task file registers 530 specify the logical disc address to be read/written by the host system 504,516, and will reflect the logical disc address of the sector currently being transferred to or from the host system. Disc drive software 524 also accesses task file registers 530 as the local microprocessor 512 supervises the disc stack 507, as it executes the host system commands, and as it directs transfer of data to and from disc cache 510 and the storage media within disc stack 507. Local microprocessor includes RAM 521 in which several items described below reside, as explained below with reference to FIGS. 6-10.

FIG. 6 shows a method 600 embodying the present invention including steps 605 through 665. A disc stack rigidly supporting at least two pre-written data storage discs is constructed 610 and arranged into a disc drive so that "reference" (source) and (available potential) "target" heads can access data surfaces of the discs. A cylinder, head and sector numbers are determined for the reference head 615 and for the target heads (obtained from several queued commands 625. Differences are computed between the reference cylinder number and each of the target cylinder numbers, generating a preliminary seek length for each of several queued commands 630. The commands having "apparently short" seeks are identified 635 using a threshold, typically at least 50 cylinders and at most 5000 cylinders. Seek lengths of the "apparently short" seeks are adjusted by adding a weighted sum of several terms 645. At least one of the terms is a sinusoidal or polynomial or other simple function of the reference sector number or similar longitudinal position measurement. The terms are weighted by some coefficients that depend on the reference and/or target head identifiers. A very detailed example scenario is explained below with reference to FIGS. 7-10.

For each of several commands, a latency indicator is derived based on the command's target sector number and seek length 650. Some of these seek lengths are "adjusted" as described above. One of the queued commands is then selected for (immediate) execution based on the derived latency indicators, the selected command defining the target (destination) cylinder, head and sector 660.

FIG. 7 shows a specific function 700 coded in the "C" programming language, implementing step 645 of FIG. 6. The code includes program commands and other mathematical expressions (in remarks set off by "//") that are helpful for understanding this implementation. Sine and cosine functions are implemented in a table that is self-explanatory. The function "sa_EvalDeltaS" refers to a portion of RAM 521 called "Table.i16_DeltaS" containing 5 calibration constants (co through c4) for each "source" and "destination" head, to be explained next.

FIG. 8 shows a specific table 800 that exemplifies "Table.i16_DeltaS" as used in function 700 of FIG. 7. Column 880 shows the head number, each of the rows 810,811, 812,813 containing the coefficients for the corresponding head. In terms of function 700, column 870 contains values for "c0," column 871 contains values for "c1," column 872 contains values for "c2," column 873 contains values for "c3," column 874 contains values for "c4." The use of these coefficients is most easily understood with reference to the example of FIG. 10, and particularly with regard to command 1013 shown there.

FIG. 9 shows a seek performance model for the electromechanical system that accesses disc stack 507 of FIG. 5 for reading or writing. Disc stack 507 is accessed by an actuator assembly similar to assembly 261 of FIG. 2, but not shown in FIG. 5. Seek time 901 is shown in arbitrary, convenient units that are each equal to 1/N of a nominal disc stack revolution time, where N is the number of servo wedges on each data surface. Seek cost 902 is shown in arbitrary, convenient units that are each equivalent to one nominal data track width. Profile 960 shows a read seek time within which a seek having a given cost will reliably be complete so as to permit data to be read from the disc stack. Profile 970 shows a write seek time within which a seek having a given cost will reliably be complete so as to permit data to be written to the disc stack. Model 900 predicts that even a very short seek require about 20 servo wedges to settle reliably, and about 28 servo wedges to settle reliably enough to permit writing. Both profiles 960, 970 were derived empirically based on a given actuator assembly's performance. Both profiles 960,970 predict seek performance to at least about 99% certainty (i.e. so that less than 1% of the seeks at a given cost take longer than the time given by model 900).

FIG. 10 shows a queue 1000 that contains commands to be manipulated in illustrating the operation of the present invention. Each of the rows 1001 through 1038 represents one disc access command. Column 1051 indicates whether the command is a read (0) or a write (1). Columns 1052,1053,1054 respectively indicate the cylinder, head and sector of the command. For simplicity of the present example, the sector numbers designated in column 1054 are servo sector numbers that are assumed to align between data surfaces. In a typical modern implementation some sector number transformations may be appropriate.

Suppose that a prior command has just been completed and that the head that was used for it is a reference head, for present purposes. Disc stack rotation speed and seek speed are both effectively constant. The reference head's longitudinal position (sector) and lateral (track) position were known a very short (measured) time ago, during the just-finished execution. Therefore suppose it is known that the source location is cylinder 31000, head 2, and sector 44. The question is to determine which of the queued commands to execute next.

Note that it is not possible to execute command 1008 without a full disc stack rotation, which is a very substantial delay. This is because command 1008 requires a read from cylinder 30969, 31 tracks away from the source head's current position at cylinder 31000. Commands 1009,1010,1011 are also not feasible for a short latency (i.e. less than one disc rotation) because model 900 shows that a longitudinal delay of more than 20 sectors is always required for a reliable seek. Command 1012 has a target destination (sector) only 21 sectors away, indicating much too short a time within which to execute a seek from cylinder 31000 to cylinder 14733. Command 1013 has a target destination 25 sectors away, which indicates a long enough duration to execute a very short read seek. By applying the method, function, table and model of FIGS. 6-9, however, it will become clear that command 1013 is not viable for a partial revolution seek.

Note that microprocessor 512 is configured to implement steps 615 through 660 of FIG. 6, and that all features of FIGS. 7-9 are effectively stored in RAM 521 and available for use. At step 635 of method 600, several commands are identified with "apparently short" seeks from "reference cylinder" number 31000. Those "identified" include commands 1013, 1014 and 1015 but not command 1012. (It may be convenient to consider each command in the sequence shown in FIG. 10, rather than to compute all "preliminary" seek lengths before deciding which command to execute next). Advantageously, method 600 provides a mechanism for executing the function of FIG. 7 selectively, only on "apparently short" seeks.

Values 1060 are computations that can optionally be performed on the values from queue 1000 in implementing the present invention. They can be performed in parallel and stored in a table, or they can be performed successively so as to save memory. Column 1061 contains each apparent seek length. Column 1062 contains an adjustment to be added to the seek lengths of those seeks that are "apparently short". Column 1063 contains an adjusted list of several seek length values, only some of which are adjusted. Column 1064 contains an indication of whether a command's target is reliable reachable within a predetermined longitudinal interval (of a partial or full revolution), for each of the commands containing a potential target within a quarter-revolution of the source head's most recently measured location.

Consider step 645 (as function 700) applied to command 1013 with reference head 2 at cylinder 31000 and sector 44. In the order of method 700, the "adjustment" to the seek length will be a sum of five terms:

The "c4" term will be $COS(2* pi * 44/288) * (-10-0) = -5.7$.

The "c3" term will be $SIN(2* pi * 44/288) * (-32--2) = -24.6$.

The "c2" term will be $(30973/16/2^{15})^2 * (-1775-248) = -7.1$.

The "c1" term will be $(30973/16/2^{15}) * (43-402) = -21.2$.

The "c0" term will be $(16--13) = 29$.

The adjusted seek length is this:

$$|30973-31000+(-5.7+-24.6+-7.1+-21.2+29)|=|-56.6|=56.6.$$

Even for a read command, model 900 shows that a seek cost of 56.6 cannot reliably be accommodated within just 25 sectors. Command 1013 is accordingly not selected, despite its apparent seek length of only 27 cylinders. By similar calculations it can be shown that the adjusted seek length for command 1014 is this:

$$|31022-31000+(-6.3+-23.8+-5.4+-21.9+29)|=|-6.3|=6.3.$$

It is apparent from this calculation that although command 1014 is apparently an inward seek of only about 22 track widths, it is actually more like an outward seek of about 6 track widths. This is a very short and easy seek to accomplish in an interval 34 sectors long, according to model 900. By enhancing the accuracy of seek cost indicators, this example shows that the ordering of commands can be enhanced. The effect of this enhancement will be especially pronounced for queued commands that define a clusters of queued targets denser then 5 targets per 5 tracks, which is denser than those of FIG. 10. It will also be more pronounced for a system with an actuator assembly with seek time models that require very short seeks to be complete and settled in less than one millisecond. This is faster than those of FIG. 9, for which 1 mS is about 17 units on the scale of seek time 901.

It is to be understood that even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular position monitoring application while maintaining substantially the same functionality. Although the more detailed embodiments described above relate to data handling devices, other applications involving command sorting can readily benefit from these teachings without departing from the scope and spirit of the present invention. For example, although the above examples are typically oriented toward storing calibration data in a non-volatile memory during a manufacturing operation, such operations can also be used in a periodic or initial field calibration operation.

Moreover, it will be appreciated by those skilled in the art that the selection of a suitable combination of calibration memory size, accuracy, and formula complexity is a trade-off. The best solution will depend on the application, and except as specified below, no particular solution to this trade-off is of critical importance to the present invention. Moreover a selection of formulae will typically be available and readily derived, depending on the applicable geometry. One of ordinary skill will be able to use the above description to make and use a variety of polynomial- or sinusoid-based or other implementations in light of the teachings above, without undue experimentation.

What is claimed is:

1. A method of selecting a target destination from among first and second target destinations, the method comprising:

determining first and second preliminary seek lengths between a source cylinder on a data storage disc corresponding to a source head and target cylinders on the data storage disc corresponding to the first and second target destinations based on lateral distances from the source cylinder to the target cylinders;

generating a first adjusted seek length for the first target destination and a second adjusted seek length for the second target destination by adjusting the first and second preliminary seek lengths using respective lateral offset indicators that represent offsets in the lateral distance of target heads from the target cylinders relative to the first and second preliminary seek lengths and that are generated in response to a longitudinal position measurement of the source head; and selecting the target destination in response to the first and second adjusted seek lengths.

2. The method of claim 1, further comprising:

(a1) estimating several preliminary seek lengths each corresponding to a queued command, a first one of the estimated preliminary seek lengths comprising the first adjusted seek length;

(a2) determining that the first adjusted seek length corresponds to one of the queued commands that refers to a non-ideal target, the non-ideal target not being reliably reachable within a one-cycle delay; and (a3) selecting another of the queued commands to be executed immediately so that the selected command refers to the second target destination, the second target destination being reliably reachable within a partial cycle delay.

3. The method of claim 1, further comprising:

deriving an adjusted seek length for each one of several queued commands, two of the several adjusted seek lengths being the first and second adjusted seek lengths.

4. The method of claim 1, further comprising: of obtaining the longitudinal position measurement as a scalar value using the source head, wherein the source head cannot access the first or second target destination.

5. The method of claim 1, further comprising: calculating each of the adjusted seek lengths as an arithmetic combination of several terms, at least one of the terms being a sinusoidal function of the longitudinal position measurement.

6. The method of claim 1, further comprising:

(a1) determining a source cylinder identifier, a source head identifier, and a source sector identifier for the source head, the source sector identifier being the longitudinal position measurement;

(a2) receiving many queued commands that each include a target cylinder identifier, a target head identifier, and a target sector identifier;

(a3) computing a difference between the source cylinder identifier of the determining step (a1) and each of the target cylinder identifiers so as to obtain a preliminary seek length corresponding to each of the queued commands of the receiving step (a2);

(a4) identifying at least two of the queued commands of the receiving step (a2), the preliminary seek length corresponding to each of the identified commands being smaller that a predetermined threshold;

(a5) adjusting the seek length corresponding to each of the identified commands of the identifying step (a4), the adjustments each being partly based on the corresponding identified command's target head identifier, on the source head identifier, and on the source sector identifier, the adjustments being the lateral offset indicators, the adjusted seek lengths including the first and second adjusted seek lengths;

(a6) deriving several latency indicators each corresponding to one of the queued commands of the receiving step (a2), each of the latency indicators based on the corresponding command's target sector identifier and seek length, at least two of the several latency indicators based on the adjusted seek lengths of the adjusting step (a5); and (a7) executing one of the queued commands of the receiving step (a2) selected based on the latency indicators of the deriving step (a6), using as the target destination the selected command's target cylinder identifier, the selected command's target head identifier, and the selected command's target sector identifier.

7. The method of claim 1, further comprising:

(a1) positioning a disc stack rigidly supporting at least two pre-written data storage discs into a disc drive so that the target destination is a storage location on one of the data storage discs; and (a2) deriving a calibrated offset model that defines how the longitudinal position measurement affects the lateral offset indicators.

8. An apparatus including:

a disc stack having at least one rotatable data storage disc including at least two data storage surfaces; and a controller configured to select a target destination on one of the data storage surfaces from among first and second target destinations using at least two adjusted seek lengths comprising lateral distances from first and second target heads corresponding to the first and second target destinations to the respective first and second target destinations, the at least two adjusted seek lengths including a first adjusted seek length for the first target destination and a second adjusted seek length for the second target destination, wherein the first and second adjusted seek lengths are generated by adjusting first and second preliminary seek lengths that represent respective lateral distances from a source cylinder to first and second target cylinders corresponding to the first and second target destinations in response to corresponding lateral offset indicators that represent offsets in the lateral distance of the first and second target heads from the first and second target cylinders relative to the first and second preliminary seek lengths and that are generated in response to a longitudinal position measurement of a source head.

9. The apparatus of claim 8, further including: a target head able to access the target destination but not able to access-a source location; wherein the source head is able to access the source location but is not able to access the target destination.

10. The apparatus of claim 8, in which the controller includes a random-access memory configured to contain a queue of more than 32 disc access commands in which each of the commands includes a target cylinder identifier, a target head identifier, and a target sector identifier.

11. A method comprising:

generating estimates of first and second seek lengths that represent lateral distances of first and second target heads to respective first and second target cylinders for queued disc access commands by adjusting first and second preliminary seek lengths that represent lateral distances from a source cylinder to the first and second target cylinders to compensate for lateral offset present between a source head that performed a previously executed disc access command and the first and second target heads.

12. The method of claim 11, further comprising:
receiving first and second disc access commands, the first and second disc access commands identifying respective first and second target locations on the disc, each target location including a target cylinder, a target head and a target sector; and
generating a first preliminary seek length for the first disc access command in response to a source cylinder and the target cylinder of the first disc access command, and generating a second preliminary seek length for the second disc access command in response to the source cylinder and the target cylinder of the second disc access command;
wherein adjusting the estimates of the seek lengths comprises:
generating a first seek length adjustment for the first disc access command in response to the source sector, the source head and the target head of the first disc access command, and generating a second seek length adjustment for the second disc access command in response to the source sector, the source head and the target head of the second disc access command; and
generating first and second adjusted seek lengths in response to the first and second preliminary seek lengths and the first and second seek length adjustments.

13. The method of claim 12, further comprising:
selecting one of the first or second disc access commands for execution before the other one in response to the first and second adjusted seek lengths.

14. The method of claim 12, wherein generating the first seek length adjustment comprises generating the first seek length adjustment in response to a source head and the target cylinder of the first disc access command, and wherein generating the second seek length adjustment comprises generating the second seek length adjustment in response to the source head and the target cylinder of the second disc access command.

15. The method of claim 12, further comprising:
receiving a plurality of disc access commands, each of the plurality of disc access commands identifying a respective target location on the disc, including a target cylinder, a target head and a target sector;
generating a preliminary seek length for each of the plurality of disc access commands in response to a source cylinder and their respective target cylinders; and
comparing the preliminary seek lengths to a threshold, and selecting the first and second disc access commands for consideration in response to their preliminary seek lengths being less than a threshold seek length.

16. The method of claim 12, further comprising:
in response to the first and second adjusted seek lengths, determining if the target location of the first or second disc access command can be reliably reached within a full revolution of the disc; and
selecting for execution one of the first or second disc access commands that can be reliably reached within less than a full revolution of the disc.

17. The method of claim 12, wherein generating the first and second seek length adjustments comprises calculating each of the first and second seek length adjustments as an arithmetic combination of several terms, at least one of the terms comprising a sinusoidal function of the source sector.

18. The method of claim 17, wherein at least another of the terms of the arithmetic combination comprises an exponential function of the destination cylinder.

* * * * *